(12) United States Patent
Yu et al.

(10) Patent No.: US 11,912,520 B2
(45) Date of Patent: Feb. 27, 2024

(54) REWINDING APPARATUS AND REWINDING METHOD

(71) Applicant: CONTEMPORARY AMPEREX TECHNOLOGY CO., LIMITED, Ningde (CN)

(72) Inventors: Ruchu Yu, Ningde (CN); Shaojun Qiu, Ningde (CN); Tiefeng Wu, Ningde (CN)

(73) Assignee: Contemporary Amperex Technology Co., Limited, Ningde (CN)

( * ) Notice: Subject to any disclaimer, the term of this patent is extended or adjusted under 35 U.S.C. 154(b) by 0 days.

(21) Appl. No.: 18/343,214

(22) Filed: Jun. 28, 2023

(65) Prior Publication Data
US 2023/0382675 A1 Nov. 30, 2023

Related U.S. Application Data

(63) Continuation of application No. PCT/CN2022/123042, filed on Sep. 30, 2022.

(30) Foreign Application Priority Data

Mar. 7, 2022 (CN) .......................... 202210225452.4

(51) Int. Cl.
*B65H 19/26* (2006.01)
*B65H 18/08* (2006.01)
(52) U.S. Cl.
CPC ............. *B65H 19/26* (2013.01); *B65H 18/08* (2013.01); *B65H 2301/418* (2013.01); *B65H 2301/515* (2013.01); *B65H 2408/2364* (2013.01)

(58) Field of Classification Search
CPC ... B65H 19/26; B65H 18/08; B65H 2301/418
See application file for complete search history.

(56) References Cited

U.S. PATENT DOCUMENTS 3,044,726 A * 7/1962 Schellenberg ..... B65H 19/2207
242/542.3
4,360,170 A * 11/1982 Kuklies .............. B65H 19/2238
242/531.1
(Continued)

FOREIGN PATENT DOCUMENTS

CN 104150256 B 5/2016
CN 210012378 U 2/2020
(Continued)

OTHER PUBLICATIONS

International Search Report dated Dec. 28, 2022 for Application No. PCT/CN2022/123042.

*Primary Examiner* — Sang K Kim
(74) *Attorney, Agent, or Firm* — Ladas & Parry LLP

(57) ABSTRACT

This application discloses a rewinding apparatus and a rewinding method. The rewinding apparatus is configured to rewind a strip. The rewinding apparatus includes a rewinding mechanism and a switching mechanism. The rewinding mechanism includes two shafts that are opposite to each other along a first direction and spaced out. The two shafts are configured to rewind the strip along different conveyance paths separately. The switching mechanism includes a moving roller. The moving roller is configured to drive the strip to switch from one shaft to another shaft so that the strip switches from one conveyance path to another conveyance path. The rewinding apparatus and rewinding method disclosed in this application achieve high space efficiency and high switching efficiency.

12 Claims, 7 Drawing Sheets

(56) References Cited

U.S. PATENT DOCUMENTS

| | | | | |
|---|---|---|---|---|
| 2013/0248641 A1* | 9/2013 | Niwa | ............ | B65H 19/26 |
| | | | | 242/522 |
| 2021/0292120 A1* | 9/2021 | Li | ............ | B65H 19/1847 |

FOREIGN PATENT DOCUMENTS

| CN | 210029520 U | 2/2020 |
|---|---|---|
| CN | 212558721 U | 2/2021 |
| CN | 213059556 U | 4/2021 |
| CN | 215592164 U | 1/2022 |
| JP | 2000158042 A | 6/2000 |

\* cited by examiner (a)

(b)

(c)

(d)

REWINDING APPARATUS AND REWINDING METHOD

CROSS-REFERENCE TO RELATED APPLICATIONS

This application is a continuation of International application PCT/CN2022/123042 filed on Sep. 30, 2022 that claims priority to Chinese Patent Application No. 202210225452.4, filed on Mar. 7, 2022 and entitled "REWINDING APPARATUS AND REWINDING METHOD". These applications are incorporated herein by reference in their entirety.

TECHNICAL FIELD

This application relates to the technical field of preparing a strip material, and in particular, to a rewinding apparatus and a rewinding method.

BACKGROUND

Tape-like strip materials involved in the manufacture of batteries mainly include a positive electrode plate, a negative electrode plate, and a separator. In practical use, the raw materials of the strip materials need to be cut into desired widths, and the cut-out strips are wound separately for ease of storage and transport. A coil of wide strips is usually cut into a plurality of coils of narrower strips. In the prior art, in a case that a cut-out strip is rewound by using a rewinding apparatus, after a length of strip has been rewound around one shaft, the strip needs to be manually switched onto a new shaft for further rewinding. The manual switching onto a new shaft is inefficient.

Therefore, it is necessary to design a rewinding apparatus to solve the foregoing technical problem.

SUMMARY

An embodiment of this application provides a rewinding apparatus and a rewinding method to improve switching efficiency.

According to a first aspect, this application provides a rewinding apparatus. The rewinding apparatus is configured to rewind a strip. The rewinding apparatus includes a rewinding mechanism and a switching mechanism. The rewinding mechanism includes at least two shafts that are spaced out. The two shafts are configured to rewind the strip along different conveyance paths respectively. The switching mechanism includes a moving roller. The moving roller is configured to drive the strip to switch from one shaft to another shaft so that the strip switches from one conveyance path to another conveyance path.

The rewinding apparatus according to this application can switch the strip between shafts through the moving roller, and the switching efficiency is high. During the switching, the position of the shaft does not change, thereby saving a turret involved in the prior art, saving a movement space that needs to be reserved for a position swap of the shafts, and making the entire rewinding apparatus occupy just a small space. During the switching, just the position of the switching mechanism needs to be changed, thereby simplifying the control of the rewinding apparatus. With the moving roller driving the strip to move, the moving roller exerts a uniform force on the strip, thereby avoiding damage of the strip to some extent caused when the strip is pulled by the driving piece during the movement of the strip, and improving quality of the wound strip.

According to some embodiments of this application, the switching mechanism further includes a cutting unit. The cutting unit is disposed between the shafts. The cutting unit is configured to cut off the strip so that the strip switched to another shaft is unwound from one shaft.

When the strip is rewound around one shaft, the strip is still in contact with another shaft as driven by the moving roller. The strip is slit by the cutting unit. In this way, a part of the strip is rewound onto one shaft, and the strip end connected to an external unwinding apparatus starts to be rewound onto another shaft, thereby completing the switching of the strip between the shafts.

According to some embodiments of this application, the shaft includes a hollow shaft body and a conduit made in the shaft body. The conduit is disposed along an axial direction of the moving roller. At least a part of the cutting unit is disposed in the shaft body. A tool bit of the cutting unit is configured to protrude from the conduit to cut off the strip.

The tool bit may be accommodated in the shaft body, and protrude out of the conduit to cut the strip only when the strip needs to be cut off; or, the tool bit may keep protruding from the conduit, and move along the conduit to cut the strip only when the strip needs to be cut off.

According to some embodiments of this application, a number of the shafts is two. The two shafts are opposite to each other along a first direction and spaced out. The switching mechanism includes a first translational assembly. The first translational assembly extends along the first direction. The first translational assembly is drivably connected to the moving roller so that the moving roller drives the strip to switch from one shaft to another shaft.

The first translational assembly can drive the moving roller to move along the first direction. In this way, the moving roller can drive the strip to switch from one shaft to another shaft to implement rewinding, so as to implement automatic switching between the shafts.

According to some embodiments of this application, the switching mechanism further includes a second translational assembly. The second translational assembly extends along a second direction. The second direction is an extension direction of the shaft. The second translational assembly is drivably connected to the moving roller so as to drive the moving roller to get inserted between the strip and the shaft along the second direction.

The second translational assembly can drive the moving roller to move along the second direction. In this way, when the rewinding apparatus is in a normal rewinding state, the second translational assembly can drive the moving roller to move along the second direction so that the moving roller is disposed outside the rewinding mechanism to prevent the moving roller from hindering the rewinding mechanism from normally rewinding the strip. When the rewinding apparatus is in a switching state, the second translational assembly can drive the moving roller to get inserted between the strip and the shaft. Therefore, as further driven by the first translational assembly, the moving roller can switch the strip from one shaft to another shaft to implement rewinding.

According to some embodiments of this application, the second translational assembly is slidably connected to the first translational assembly.

With the moving roller directly connected to just one of the first translational assembly or the second translational assembly, the second translational assembly can drive the moving roller to move, and the first translational assembly can drive the moving roller to move.

According to some embodiments of this application, the first translational assembly includes a first driving piece and a first slide rail extending along the first direction. The second translational assembly includes a second driving piece and a second slide rail extending along the second direction. The first driving piece is configured to drive the second slide rail to move along the first slide rail, and the second driving piece is configured to drive the moving roller to move along the second slide rail.

The second slide rail can move along the first slide rail as driven by the first driving piece, and the moving roller can move along the second slide rail as driven by the second driving piece. In this way, the first driving piece and the second driving piece control the moving roller to move along the first direction and the second direction.

According to some embodiments of this application, the switching mechanism further includes a rocker arm. One end of the rocker arm is connected to the moving roller, another end of the rocker arm is connected to the second translational assembly. The rocker arm is configured to drive the moving roller to oscillate.

The second translational assembly can drive the rocker arm and the moving roller to move together along the second direction. The rocker arm can drive the moving roller to oscillate, so as to facilitate avoidance of other components in a process of driving the switching of the strip between the shafts.

According to some embodiments of this application, the rewinding mechanism further includes a plurality of idler rollers. The idler rollers are disposed along the conveyance path. Each shaft fits at least one idler roller to form a different conveyance path.

One or more idler rollers can define different conveyance routes to meet production needs. The idler rollers can also ensure that the strip is in a tensioned state to ensure stable conveyance of the strip.

According to a second aspect, this application further provides a rewinding method, including:
rewinding a strip around a first shaft;
driving, by a switching mechanism when a preset length of the strip has been rewound on the first shaft, the strip to approach a second shaft from the first shaft so that the strip switches from the first shaft to the second shaft; and
rewinding the strip around the second shaft.

The rewinding method according to this application switches the strip between the shafts by using a switching mechanism, and the switching efficiency is high. During the switching, the shaft does not need to be moved, thereby saving the turret involved in the prior art, and saving a movement space that needs to be reserved for a position swap of the shafts, and reducing space occupation in the rewinding and switching processes. During the switching, just the movement of the switching mechanism needs to be controlled, thereby simplifying the control.

According to some embodiments of this application, the driving, by a switching mechanism, the strip to approach a second shaft from the first shaft includes: moving the switching mechanism along a first direction so as to approach the second shaft from the first shaft, where the first shaft and the second shaft are opposite to each other along the first direction and spaced out.

The operation of moving the switching mechanism along the first direction to further implement the switching is simple and easy to implement.

According to some embodiments of this application, before the driving, by a switching mechanism, the strip to approach a second shaft from the first shaft, the method includes: moving the switching mechanism along a second direction so that the switching mechanism is inserted between the strip and the shaft along the second direction, where the second direction is an extension direction of the first shaft.

By moving the switching mechanism along the second direction, the switching mechanism can, in a normal rewinding state, be disposed outside the rewinding mechanism by moving along the second direction. In this way, the switching mechanism is prevented from hindering the rewinding mechanism from normally rewinding the strip. When the rewinding apparatus is in a switching state, the switching mechanism can move along the second direction to get inserted between the strip and the shaft, and can further move along the first direction to drive the strip to switch from one shaft to another to implement rewinding.

According to some embodiments of this application, after the moving the switching mechanism along a second direction, the method includes: oscillating the switching mechanism so that a projection of the switching mechanism partly overlaps a projection of the second shaft along the first direction, and driving, by the switching mechanism, the strip to abut on the second shaft.

The oscillation of the switching mechanism makes it convenient for the switching mechanism to avoid other components in a process of driving the strip to switch between the shafts.

According to some embodiments of this application, after moving the switching mechanism along a first direction so as to approach the second shaft from the first shaft, the method includes:
moving the cutting unit to contact and cut off the strip so that the strip switched to the second shaft is unwound from the first shaft; and
moving the switching mechanism to an outside of the rewinding mechanism along the second direction.

The foregoing description is merely an overview of the technical solutions of this application. Some specific embodiments of this application are described below illustratively to enable a clearer understanding of the technical solutions of this application, enable implementation of the technical solutions based on the subject-matter hereof, and make the foregoing and other objectives, features, and advantages of this application more evident and comprehensible.

BRIEF DESCRIPTION OF DRAWINGS

To describe the technical solutions of the embodiments of this application more clearly, the following outlines the drawings used in the embodiments of this application. Evidently, the drawings outlined below are merely a part of embodiments of this application. A person of ordinary skill in the art may derive other drawings from the outlined drawings without making any creative efforts.

REFERENCE NUMERALS

Figure 1:
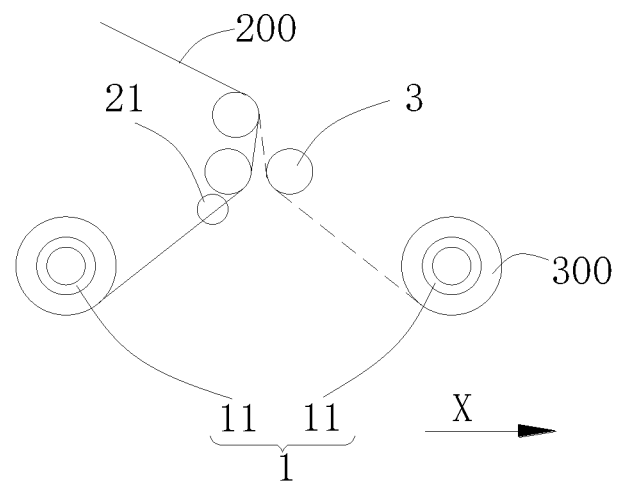
FIG. 1 is a schematic structural diagram of a rewinding apparatus according to some embodiments of this application.

100. Rewinding apparatus; 200. strip; 300. reel; 1. rewinding mechanism; 11. shaft; 111. shaft body; 112. conduit; 2. switching mechanism; 21. moving roller; 22. first translational assembly; 221. first driving piece; 222. first slide rail; 223. first guide rod; 23. second translational assembly; 231. second driving piece; 232. second slide rail; 2321. mounting bracket; 2322. slide block; 2323. slide rail body; 24. rocker arm; 241. moving bracket; 242. third driving piece; 243. supporting arm; 3. idler roller; 4. cutting unit; 41. motor; 42. tool bit.

DETAILED DESCRIPTION OF EMBODIMENTS

The following gives a more detailed description of implementations of this application with reference to drawings and embodiments. The detailed description of the following embodiments and drawings are intended to describe the principles of this application illustratively, but not to limit the scope of this application. Therefore, this application is not limited to the described embodiments.

In the description of this application, unless otherwise specified, "a plurality of" means at least two in number; the terms such as "up", "down", "left", "right", "in", and "out" indicating a direction or a position relationship are merely intended for ease or brevity of description of this application, but do not indicate or imply that the mentioned apparatus or component is necessarily located in the specified direction or constructed or operated in the specified direction. Therefore, such terms are not to be understood as a limitation on this application. In addition, the terms "first", "second", "third", and so on are merely used for descriptive purposes, but not construed as indicating or implying relative importance. "Perpendicular" does not means exact perpendicularity, but means perpendicularity falling within an error tolerance range. "Parallel" does not mean exact parallelism, but means parallelism falling within an error tolerance range.

Reference to "embodiment" in this application means that a specific feature, structure or characteristic described with reference to the embodiment may be included in at least some embodiments of this application. Reference to this term in different places in the specification does not necessarily represent the same embodiment, nor does it represent an independent or alternative embodiment in a mutually exclusive relationship with other embodiments. A person skilled in the art explicitly and implicitly understands that the embodiments described in this application may be combined with other embodiments.

The directional terms appearing in the following description indicate the directions shown in the drawings, but are not intended to limit specific structures in this application. In the description of this application, unless otherwise expressly specified, the terms "mount", "concatenate", and "connect" are understood in a broad sense. For example, a "connection" may be a fixed connection, a detachable connection, or an integrated connection, and may be a direct connection or an indirect connection implemented through an intermediary. A person of ordinary skill in the art can understand the specific meanings of the terms in this application according to specific situations.

The applicant hereof finds that tape-like strip materials involved in the manufacture of batteries mainly include a positive electrode plate, a negative electrode plate, and a separator. During the manufacture, the raw materials of the strip materials need to be cut into desired widths, and the cut-out strips are wound separately for ease of storage and transport. A coil of wide strips is usually cut into a plurality of coils of narrower strips. A plurality of shafts may be disposed to rewind the plurality of cut-out strips. After a length of strip has been rewound around one shaft, the strip needs to be manually switched onto a new shaft for further rewinding. The manual switching onto a new shaft is inefficient. The applicant hereof finds that two shafts may be placed on a turret. A rocker arm assembly with a cutter is disposed on one side of the turret. When a shaft needs to be replaced for rewinding, the turret rotates to drive the new shaft to rotate toward the rocker arm assembly. The rocker arm assembly is lifted to make the strip fit the new shaft and cut the strip. However, because the two shafts need to rotate through the turret to swap positions during the switching between the shafts, the entire rewinding apparatus occupies a large space. Especially when a coil of unwound strip is cut and rewound onto a plurality of shafts, a plurality of turrets need to be disposed concurrently to rewind the cut-out strips separately. The plurality of turrets cause the entire rewinding apparatus to occupy a larger space.

Based on the foregoing problem found by the applicant hereof, the applicant has improved the structure of the existing rewinding apparatus. The technical solution described in an embodiment of this application is applicable to any scenario in which the strip needs to be rewound. The rewinding apparatus may be stand-alone, or may be disposed in a battery manufacture system and used in conjunction with other apparatuses in the battery manufacture system.

Figure 2:
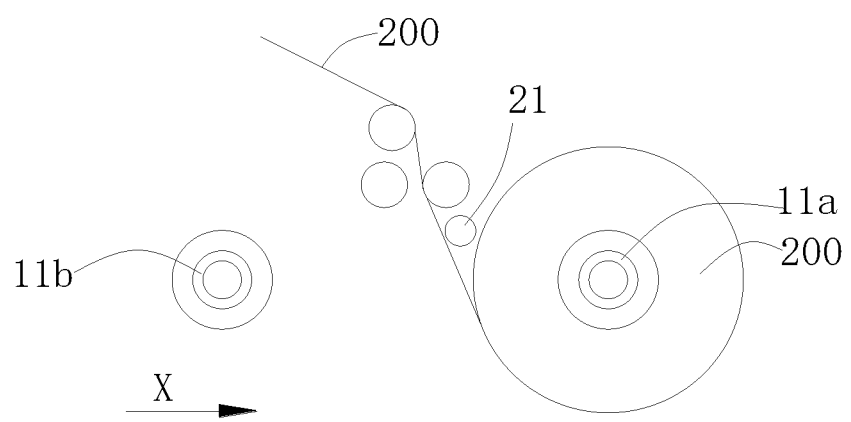
FIG. 2 is a schematic structural diagram of a rewinding apparatus according to some other embodiments of this application.

According to some embodiments of this application, referring to FIG. 1 and FIG. 2, this application provides a rewinding apparatus 100. The rewinding apparatus 100 is configured to rewind a strip 200. The rewinding apparatus 100 includes a rewinding mechanism 1 and a switching mechanism 2. The rewinding mechanism 1 includes at least two shafts 11 that are spaced out. The two shafts 11 are configured to rewind the strip 200 along different conveyance paths separately. The switching mechanism 2 includes a moving roller 21. The moving roller 21 is configured to drive the strip 200 to switch from one shaft 11 to another shaft 11 so that the strip 200 switches from one conveyance path to another conveyance path.

A person skilled in the art understands that, an unwinding apparatus, a strip processing apparatus, and the like may be disposed upstream of the rewinding apparatus 100. The wound strip 200 to be processed is released from the unwinding apparatus and processed by the strip processing apparatus as required, and then conveyed to the rewinding apparatus 100 and rewound onto the shaft 11 by the rewinding apparatus 100. Specifically, the strip processing apparatus may be an electroplating apparatus, a cutting apparatus, a coating apparatus, or the like. The moving paths of the strips 200 rewound onto different shafts 11 in the unwinding apparatus and the strip processing apparatus may be the same or different.

It is hereby noted that, the strip 200 is usually not directly wound onto the outer wall of the shaft 11. The shaft 11 is sheathed in a reel 300. The strip 200 is wound on the outer wall of the reel 300. The reel 300 rotates together with the shaft 11 to implement the rewinding of the strip 200. The reel 300 together with the strip 200 is removed from the shaft 11 upon completion of the rewinding. In this application, the shaft 11 rewinding the strip 200 may be understood as the shaft 11 rotating to drive the strip 200 to rewind onto the reel 300. In the embodiments shown in FIG. 1 and FIG. 2, the number of shafts 11 is two. Therefore, when one shaft 11 rewinds the strip 200, the reel 300 on the other shaft 11 may be removed together with the strip 200, and a new reel 300 is put on the shaft 11, thereby implementing continuous rewinding of the strip and improving the rewinding efficiency of the strip 200. Definitely, in another embodiment, the rewinding mechanism 1 may include more shafts 11. The switching mechanism 2 moves between two of a plurality of shafts 11 whenever switching the strip between the shafts, so as to drive the strip 200 to switch onto a new shaft 11 to implement rewinding.

The conveyance path may be represented by a moving path of the strip 200. In this application, each different shaft 11 corresponds to a different conveyance path. That is, the moving path of the strip 200 rewound on a different shaft 11 is different. For example, as shown in FIG. 1, the left shaft 11 rewinds the strip 200. When the right shaft 11 rewinds the strip 200, the strip 200 moves along the path shown by the dashed line. Optionally, when the moving paths of the strips 200 rewound on different shafts 11 are compared, the moving paths upstream of the rewinding apparatus 100 are the same or at least partly the same. After the strip 200 moves to the rewinding apparatus 100, the moving paths of the strips 200 rewound on different shafts vary depending on the position of the shaft 11.

The moving roller 21 may move as driven by one or more driving pieces. A person skilled in the art may set the connection relationships between a motor, an air cylinder, a lead screw, a guide rail, a gear, and other structures according to actual situation, so that the moving roller 21 moves according to the preset moving direction, stroke, and speed. A person skilled in the art understands that the moving roller 21 may move in not only a straight line, but also in a curve as required, as long as the moving roller 21 is able to push the strip 200 to approach a new shaft 11 so that the strip can be rewound on the new shaft 11.

Figure 3:
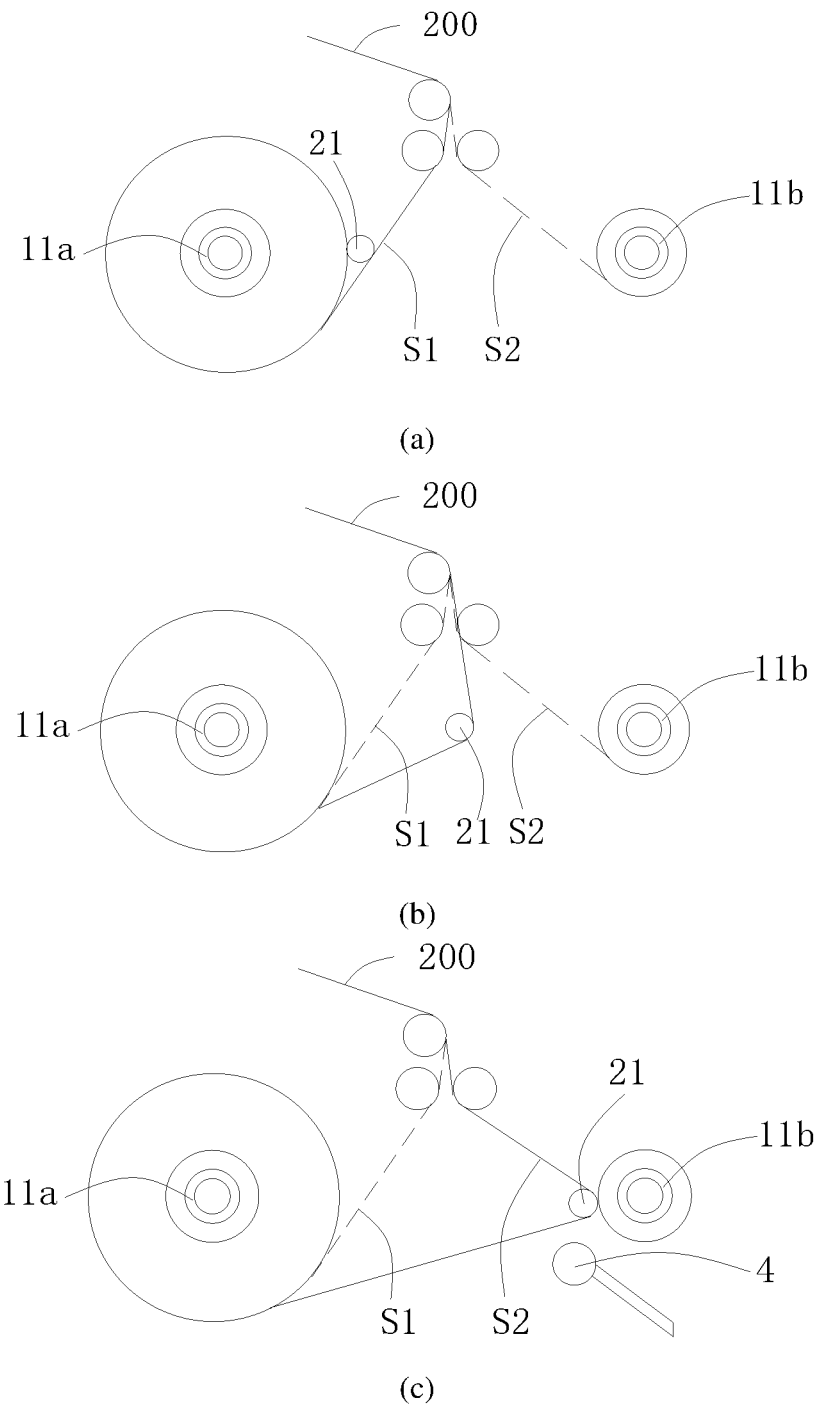
FIG. 3 is a schematic diagram of switching a strip between shafts by a rewinding apparatus according to some embodiments of this application.

Referring to FIG. 3, for ease of description, the shaft 11 that is rewinding the strip 200 in a switching process is referred to as a first shaft 11a, and the shaft 11 that is not rewinding the strip 200 is referred to as a second shaft 11b. A person skilled in the art understands that the first shaft 11a and the second shaft 11b may be structurally the same, and are named differently just depending on the status of the strip 200 that is being rewound. When the first shaft 11a rewinds the strip 200, one end of the strip 200 is limited by the first shaft 11a, and the other end of the strip 200 is limited by an upstream apparatus of the rewinding apparatus 100. The moving path of the strip 200 coincides with the conveyance path corresponding to the first shaft 11a. For example, as shown in (a), (b), and (c) of FIG. 3, when a preset length of the strip 200 has been rewound on the first shaft 11a, the moving roller 21 moves and contacts the strip 200. The moving roller 21 further moves toward the second shaft 11b. In this way, as pushed by the moving roller 21, the strip 200 in contact with the moving roller 21 gradually approaches the second shaft 11b until the strip 200 contacts the reel 300 on the second shaft 11b. The moving path of the strip 200 deviates from the conveyance path S1 corresponding to the first shaft 11a and reaches the conveyance path S2 corresponding to the second shaft 11b, and then deviates from the conveyance path S2 corresponding to the second shaft 11b and returns to the conveyance path S1 corresponding to the first shaft 11a. When a preset length of the strip 200 has been rewound on the original second shaft 11b, the original second shaft 11b may serve as a new first shaft 11a to repeat the above process. After the original first shaft 11a uses a new reel 300 to rewind the strip, the original first shaft 11a may serve as a second shaft 11b to repeat the above process.

The rewinding apparatus 100 according to this application can switch the strip between shafts through the moving roller 21, and the switching efficiency is high. During the switching, the position of the shaft 11 does not change, thereby saving a turret involved in the prior art, saving a movement space that needs to be reserved for a position swap of the shafts 11, and making the entire rewinding apparatus 100 occupy just a small space. During the switching, just the position of the switching mechanism 2 needs to be changed, thereby simplifying the control of the rewinding apparatus 100. With the moving roller 21 driving the strip 200 to move, the moving roller 21 exerts a uniform force on the strip 200, thereby avoiding damage of the strip to some extent caused when the strip 200 is pulled during the movement of the strip, and improving quality of the wound strip 200.

When the strip 200 rewound onto one shaft 11 contacts another shaft 11, the strip 200 may be cut manually or through an automated mechanical mechanism, so that the strip 200 output from an upstream apparatus is rewound onto the second shaft 11b along the conveyance path S2 corresponding to the second shaft 11b. According to some embodiments of this application, the switching mechanism 2 further includes a cutting unit 4. The cutting unit 4 is configured to cut off the strip 200 so that the strip 200 that is rewound on one shaft 11 and in contact with another shaft 11 is unwound from the one shaft.

When the strip 200 is rewound around one shaft 11, the strip 200 is still in contact with another shaft 11 as driven by the moving roller 21. The strip 200 is slit by the cutting unit 4. In this way, a part of the strip 200 is rewound onto one shaft 11, and the strip 200 end connected to an external unwinding apparatus starts to be rewound onto another shaft 11, thereby completing the switching of the strip between the shafts.

Figure 4:
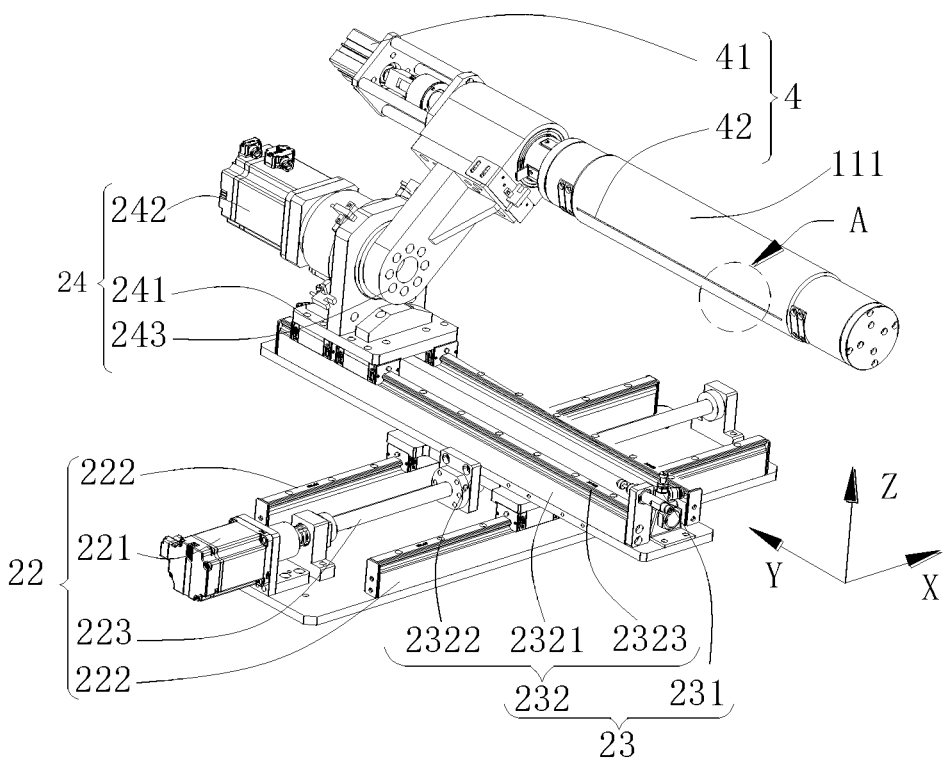
FIG. 4 is a schematic diagram of a three-dimensional structure of a switching mechanism according to some embodiments of this application.

Referring to FIG. 4, in some embodiments, the cutting unit 4 may be disposed independently from the rewinding mechanism 1 and the switching mechanism 2. When the strip 200 needs to be cut, the tool bit 42 of the cutting unit 4 moves along a width direction of the strip 200 to cut through the strip 200 to slit the strip 200. Alternatively, the tool bit 42 of the cutting unit 4 may be rotary, and the tool bit 42 of the cutting unit 4 moves along the thickness direction of the strip 200 to cut through the strip 200 to split the strip 200.

Figure 5:
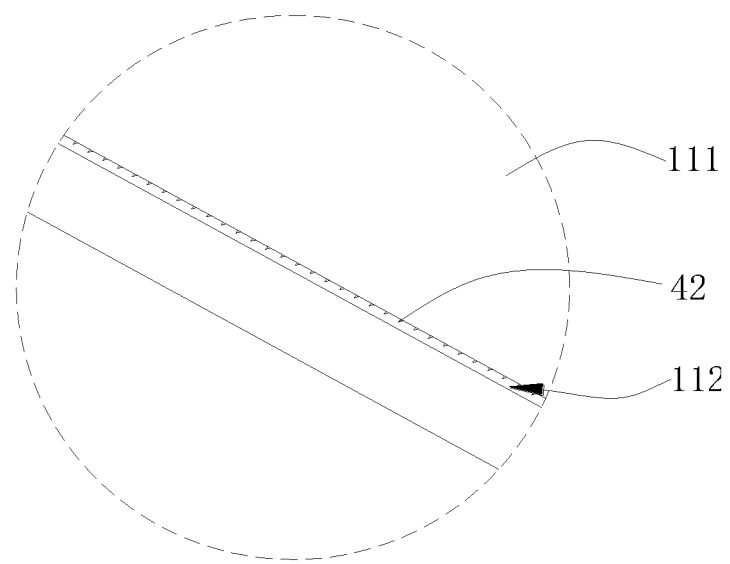
FIG. 5 is a close-up view of a part A shown in FIG. 4.

According to some embodiments of this application, referring to FIG. 5, the moving roller 21 includes a hollow shaft body 111 and a conduit 112 made in the shaft body 111.

At least a part of the cutting unit 4 is disposed in the shaft body 111. A tool bit 42 of the cutting unit 4 is configured to protrude from the conduit 112 to cut off the strip 200.

The tool bit 42 may be accommodated in the shaft body 111, and protrudes out of the conduit 112 to cut the strip 200 only when the strip 200 needs to be cut off. The cutting unit 4 may further include a motor 41 that drives the tool bit 42 to stretch or retract in the conduit 112. In order to prevent the motor 41 from hindering the moving roller 21 from driving the strip 200 to move, the motor 41 may be disposed at an end of the moving roller 21. The motor 41 and the moving roller 21 are disposed along the extension direction of the moving roller 21. Definitely, the tool bit 42 may keep protruding from the conduit 112. The tool bit 42 is correspondingly disposed on both sides of the strip 200 along the width direction of the strip to avoid the strip 200. The tool bit 42 moves along the conduit 112 only when needing to cut off the strip 200. That is, the too bit moves along the width direction of the strip 200 to cut the strip 200.

Referring to FIG. 2 to FIG. 4, according to some embodiments of this application, the number of the moving rollers 21 is two. The two moving rollers 21 are opposite to each other along a first direction X and spaced out. The switching mechanism 2 includes a first translational assembly 22. The first translational assembly 22 extends along the first direction X. The first translational assembly 22 is drivably connected to the moving roller 21 so that the moving roller 21 drives the strip 200 to switch from one shaft 11 to another shaft 11.

In some embodiments, the outer surface of the reel 300 may be pre-coated with an adhesive material. The first translational assembly 22 pushes the moving roller 21 to move along the first direction X. The moving roller 21 drives the strip 200 to move toward the second shaft 11b. In this way, the strip 200 contacts the second shaft 11b. That is, the strip 200 fits the reel 300 that is put on the second shaft 11b. The second shaft 11b rotates. The strip 200 that is cut off may be rewound onto the second shaft 11b.

The first translational assembly 22 may drive the moving roller 21 to move along the first direction X. In this way, the moving roller 21 can drive the strip 200 to switch from one shaft 11 to another shaft 11 to implement rewinding, so as to implement automatic rewinding.

Still referring to FIG. 2 to FIG. 4, according to some embodiments of this application, the switching mechanism 2 further includes a second translational assembly 23. The second translational assembly 23 extends along a second direction Y. The second direction Y is an extension direction of the shaft 11. The second translational assembly 23 is drivably connected to the moving roller 21 so as to drive the moving roller 21 to get inserted between the strip 200 and the shaft 11 along the second direction Y.

The second translational assembly 23 and the first translational assembly 22 may be disposed independently of each other. The second translational assembly 23 may be specifically a linear motor disposed at one end of the moving roller 21 to drive the moving roller 21 to move along the second direction Y as a whole. The second translational assembly 23 may also be a linear motor disposed in the moving roller 21 to push a partial region in the moving roller 21 to stretch and retract. The second translational assembly 23 can drive the moving roller 21 to move along the second direction Y. In this way, when the rewinding apparatus 100 is in a normal rewinding state, the second translational assembly 23 can drive the moving roller 21 and the rewinding mechanism 1 to move along the second direction Y so that the moving roller is disposed outside the rewinding mechanism 1 to prevent the moving roller 21 from hindering the rewinding mechanism 1 from normally rewinding the strip 200. When the rewinding apparatus 100 is in a switching state, the second translational assembly 23 can drive the moving roller 21 to get inserted between the strip 200 and the shaft 11. Therefore, as further driven by the first translational assembly 22, the moving roller 21 can switch the strip 200 from one shaft 11 to another shaft 11 to implement rewinding.

According to some embodiments of this application, the second translational assembly 23 is slidably connected to the first translational assembly 22.

The second translational assembly 23 may drive the moving roller 21 and the first translational assembly 22 to move together along the second direction Y, or, the first translational assembly 22 may drive the moving roller 21 and the second translational assembly 23 to move together along the first direction Y. With the moving roller 21 directly connected to just one of the first translational assembly 22 or the second translational assembly 23, the second translational assembly 23 can drive the moving roller 21 to move, and the first translational assembly 22 can drive the moving roller 21 to move. For example, in the embodiment shown in FIG. 4, the first translational assembly 22 drives the moving roller 21 and the second translational assembly 23 to move together along the first direction X. The first translational assembly 22 may be disposed opposite to the rewinding mechanism 1 along the second direction Y, thereby preventing, to some extent, the first translational assembly 22 from hindering the shaft 11 from rewinding in a case that the first translational assembly is disposed or moved to a position between the two shafts 11.

Still referring to FIG. 2 to FIG. 4, in an embodiment, the first translational assembly 22 includes a first driving piece 221 and a first slide rail 222 extending along the first direction X. The second translational assembly 23 includes a second driving piece 231 and a second slide rail 232 extending along the second direction Y. The first driving piece 221 is configured to drive the second slide rail 232 to move along the first slide rail 222. The second driving piece 231 is configured to drive the moving roller 21 to move along the second slide rail 232.

Optionally, in some embodiments, the first translational assembly 22 further includes a first guide rod 223, and the number of the first slide rails 222 is two. The two first slide rails 222 are disposed on two opposite sides of the first slide rail 222 respectively. The first guide rod 223 and the two first slide rails 222 extend along the first direction X. In order to ensure precise movement of the moving roller 21 in the first direction X, the first driving piece 221 may be a motor. The second slide rail 232 includes a mounting bracket 2321, a plurality of slide blocks 2322 disposed on the mounting bracket 2321, and a slide rail body 2323. The slide blocks 2322 and the slide rail body 2323 are disposed on two opposite sides of the mounting bracket 2321 respectively. The first guide rod 223 and the two first slide rails 222 are slidably connected to at least one slide block 2322 separately, so that the second slide rail 232 possesses a plurality of support points on the first translational assembly 22, and the second slide rail 232 moves stably when the first driving piece 221 drives the second slide rail 232 to move along the first direction X. Because the second driving piece 231 needs only to control the moving roller 21 to extend into or retract from the space between the shaft 11 and the strip 200. Therefore, the control precision of the second driving piece 231 may be lower than that of the first driving piece 221. The second driving piece 231 may be an air cylinder to reduce the manufacture cost.

The second slide rail 232 can move along the first slide rail 222 as driven by the first driving piece 221. The moving roller 21 can move along the second slide rail 232 as driven by the second driving piece 231. In this way, the first driving piece 221 and the second driving piece 231 control the moving roller 21 to move along the first direction X and the second direction Y.

According to some embodiments of this application, the switching mechanism 2 further includes a rocker arm 24. One end of the rocker arm 24 is connected to the moving roller 21, and another end of the rocker arm is connected to the second translational assembly 23. The rocker arm 24 is configured to drive the moving roller 21 to oscillate.

Optionally, the rocker arm 24 includes a moving bracket 241 slidably connected to the second slide rail 232, a third driving piece 242 disposed on the moving bracket 241, and a supporting arm 243 connected to the third driving piece 242. One end of the supporting arm 243 is connected to the third driving piece 242, and the other end of the supporting arm is connected to the moving roller 21. The second driving piece 231 drives the moving bracket 241 to move along the second slide rail 232. The moving roller 21 moves together with the moving bracket 241 along the second slide rail 232. The third driving piece 242 drives the rocker arm 24 to rotate along an axis. The axis extends along the second direction Y. The moving roller 21 rotates together with the supporting arm 243 along the axis.

The second translational assembly 23 can drive the rocker arm 24 and the moving roller 21 to move together along the second direction Y. The rocker arm 24 can drive the moving roller 21 to move curvilinearly, so as to diversify the directions in which the moving roller 21 can move, and facilitate avoidance of other components in a process of driving the switching of the strip 200 between the shafts.

Figure 6:
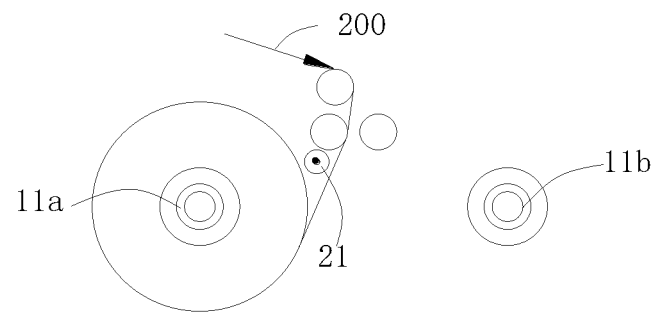
FIG. 6 is a schematic diagram of switching a strip between shafts by a rewinding apparatus according to some other embodiments of this application.
Figure 6:
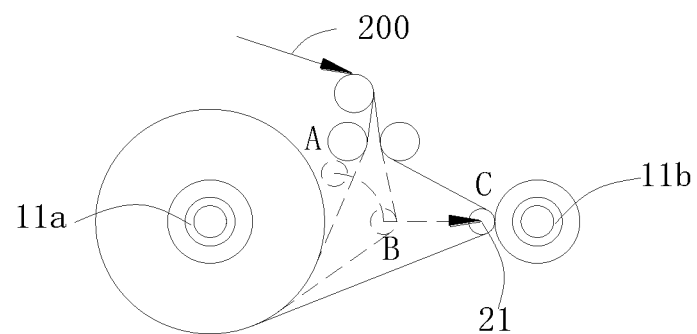
Figure 6:
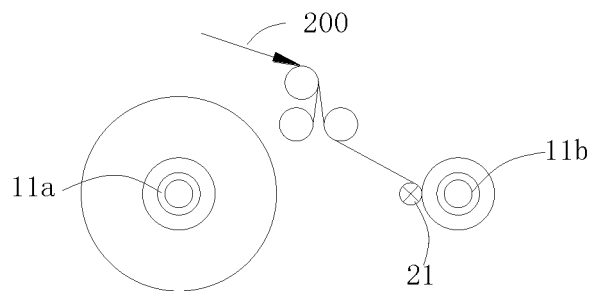
Figure 6:
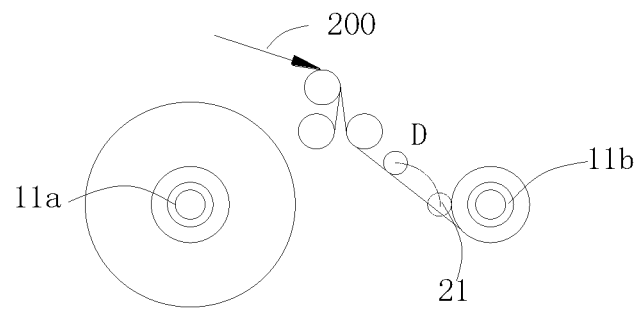

Referring to (a), (b), and (c) of FIG. 6, in an embodiment, the moving roller 21 is located at a position A, and the moving roller 21 is located outside the rewinding mechanism 1. The moving roller 21 and the rewinding mechanism 1 are disposed opposite to each other along the second direction Y. When a preset length of the strip 200 has been rewound around the first shaft 11a, the moving roller 21 is inserted between the first shaft 11a and the strip 200 along the second direction Y under the action of the second driving piece 231. The moving roller 21 rotates along the axis of the third driving piece 242 until moving to a position B under the action of the third driving piece 242. The position B is on a line connecting the first shaft 11a and the second shaft 11b along the first direction X. Under the action of the first driving piece 221, the moving roller 21 approaches the second shaft 11b along the first direction X until the moving roller 21 presses the strip 200 against the second shaft 11b. The moving roller 21 moves to a position C to cut off the strip 200, and the second shaft 11b rotates to rewind the strip 200. Under the action of the second driving piece 231, the moving roller 21 retracts along the second direction Y until the moving roller is disposed opposite to the rewinding mechanism 1 along the second direction Y. When a preset length of the strip 200 has been rewound around the second shaft 11b, the total diameter of the second shaft 11b and the strip 200 has increased compared to the second shaft 11b itself. When the second shaft 11b rewinds the strip, the moving roller 21 may further rotate along the axis of the third driving piece 242 under the action of the third driving piece 242, and move away from the second shaft 11b until a position D, thereby making it convenient to insert the moving roller 21 between the second shaft 11b and the strip 200 along the second direction Y directly under the action of the second driving piece 231 during a switching operation performed subsequently on the second shaft 11b.

Figure 7:
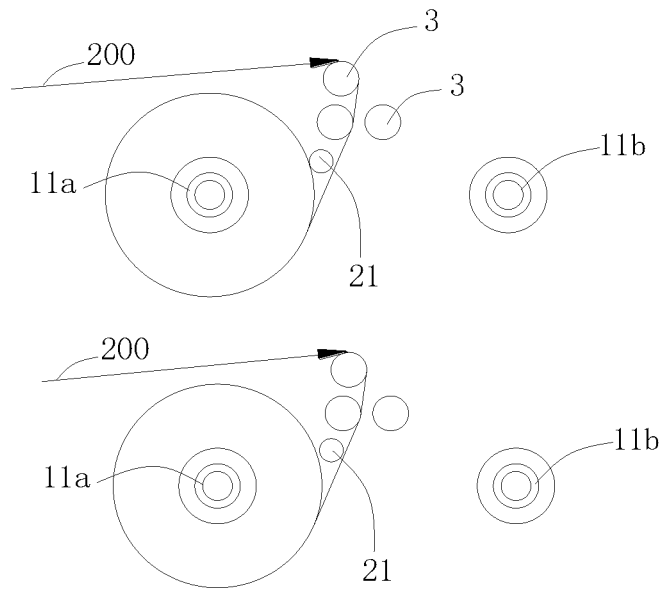
FIG. 7 is a schematic structural diagram of a rewinding apparatus according to some embodiments of this application.

Referring to FIG. 7, according to some embodiments of this application, the rewinding mechanism 1 further includes a plurality of idler rollers 3. The idler rollers 3 are disposed along the conveyance path. Each shaft 11 fits at least one idler roller 3 to form a different conveyance path.

One or more idler rollers 3 can define different conveyance routes to meet production needs. The idler rollers 3 can also ensure that the strip 200 is in a tensioned state to ensure stable conveyance of the strip 200.

The rewinding apparatus 100 according to this application may further include a plurality of rewinding mechanisms 1 and switching mechanisms 2 that are in one-to-one correspondence with the rewinding mechanisms 1. The plurality of rewinding mechanisms 1 may rewind the same cut-out strip material separately.

According to some embodiments of this application, referring to FIG. 1 to FIG. 3, this application provides a rewinding apparatus 100. The rewinding apparatus 100 includes a rewinding mechanism 1 and a switching mechanism 2. The rewinding mechanism 1 includes at least two shafts 11 that are spaced out. The two shafts 11 are configured to rewind the strip 200 along different conveyance paths respectively. The switching mechanism 2 includes a moving roller 21. The moving roller 21 is configured to drive the strip 200 to switch from one shaft 11 to another shaft 11 so that the strip 200 switches from one conveyance path to another conveyance path. When the rewinding apparatus 100 according to this application switches the strip between shafts, the positions of the shafts 11 do not change, thereby saving a turret involved in the prior art, saving a movement space that needs to be reserved for a position swap of the shafts 11, and making the entire rewinding apparatus 100 occupy just a small space. During the switching, just the position of the switching mechanism 2 needs to be changed, thereby simplifying the control of the rewinding apparatus 100. With the moving roller 21 driving the strip 200 to move, the moving roller 21 exerts a uniform force on the strip 200, thereby avoiding damage of the strip to some extent caused when the strip 200 is pulled during the movement of the strip, and improving quality of the wound strip 200.

Figure 8:
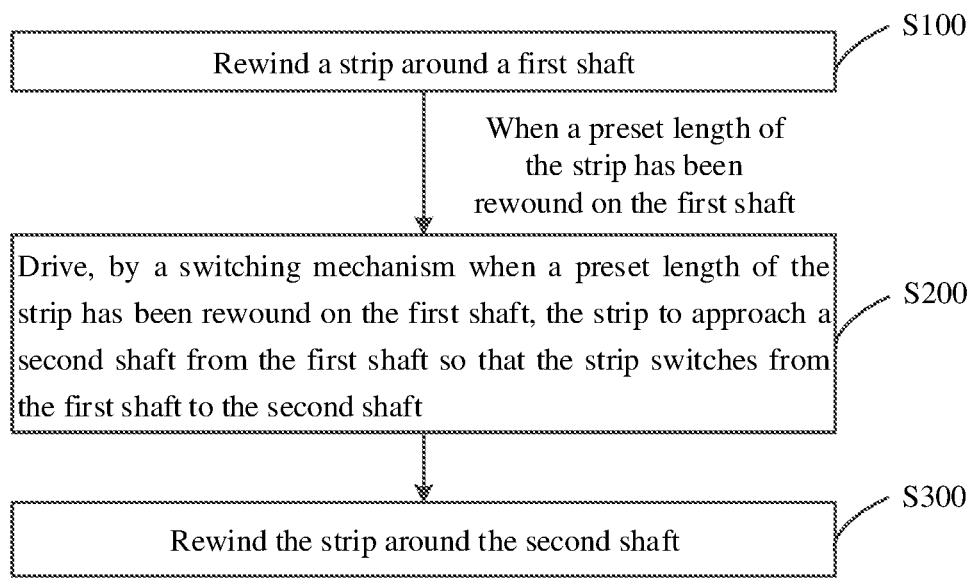
FIG. 8 is a schematic flowchart of a rewinding method according to some embodiments of this application.

According to a second aspect, referring to FIG. 8, this application further provides a rewinding method, including the following steps:

S100: Rewinding a strip around a first shaft;

S200: Driving, by a switching mechanism when a preset length of the strip has been rewound on the first shaft, the strip to approach a second shaft from the first shaft so that the strip switches from the first shaft to the second shaft; and S300: Rewinding the strip around the second shaft.

The rewinding method according to this application is applicable to the foregoing rewinding apparatus. For the relevant structure of the rewinding apparatus, reference may be made to the rewinding apparatus provided in each embodiment described above. Any one shaft in the rewinding apparatus may be selected as a first shaft, and any one shaft to which the strip can be switched may be selected as a second shaft. In step S200, the first shaft can be controlled to rotate and rewind the strip. Each shaft of the rewinding apparatus is configured to rewind the strip along a different conveyance path. When a preset length of the strip has been rewound on the first shaft, the moving roller of the switching mechanism is controlled to drive the strip to approach a second shaft from the first shaft so that the strip switches from the first shaft to the second shaft, and the strip switches from one conveyance path to another conveyance path.

A plurality of shafts may be disposed in the rewinding mechanism concurrently. The shafts may rewind the strip in sequence. By detecting the length of the strip unwound by an unwinding apparatus, the speed of unwinding, and the like, the length of the strip rewound on the shaft can be calculated, so as to determine whether a preset length of the strip has been rewound. Further, by detecting a total thickness of the strip wound around the shaft, it can be determined whether a preset length of the strip has been rewound. Alternatively, an identifier may be set at preset distance intervals on the strip, and whether a preset length of the strip has been rewound is determined by detecting the identifier. When a preset length of the strip has been rewound on one shaft, it means that a switching operation is required, and the strip needs to be transferred to another shaft for rewinding, and step 200 is performed.

The rewinding method according to this application switches the strip between the shafts by using a switching mechanism, and the switching efficiency is high. During the switching, the shaft does not need to be moved, thereby saving the turret involved in the prior art, and saving a movement space that needs to be reserved for a position swap of the shafts, and reducing space occupation in the rewinding and switching processes. During the switching, just the movement of the switching mechanism needs to be controlled, thereby simplifying the control.

Figure 9:
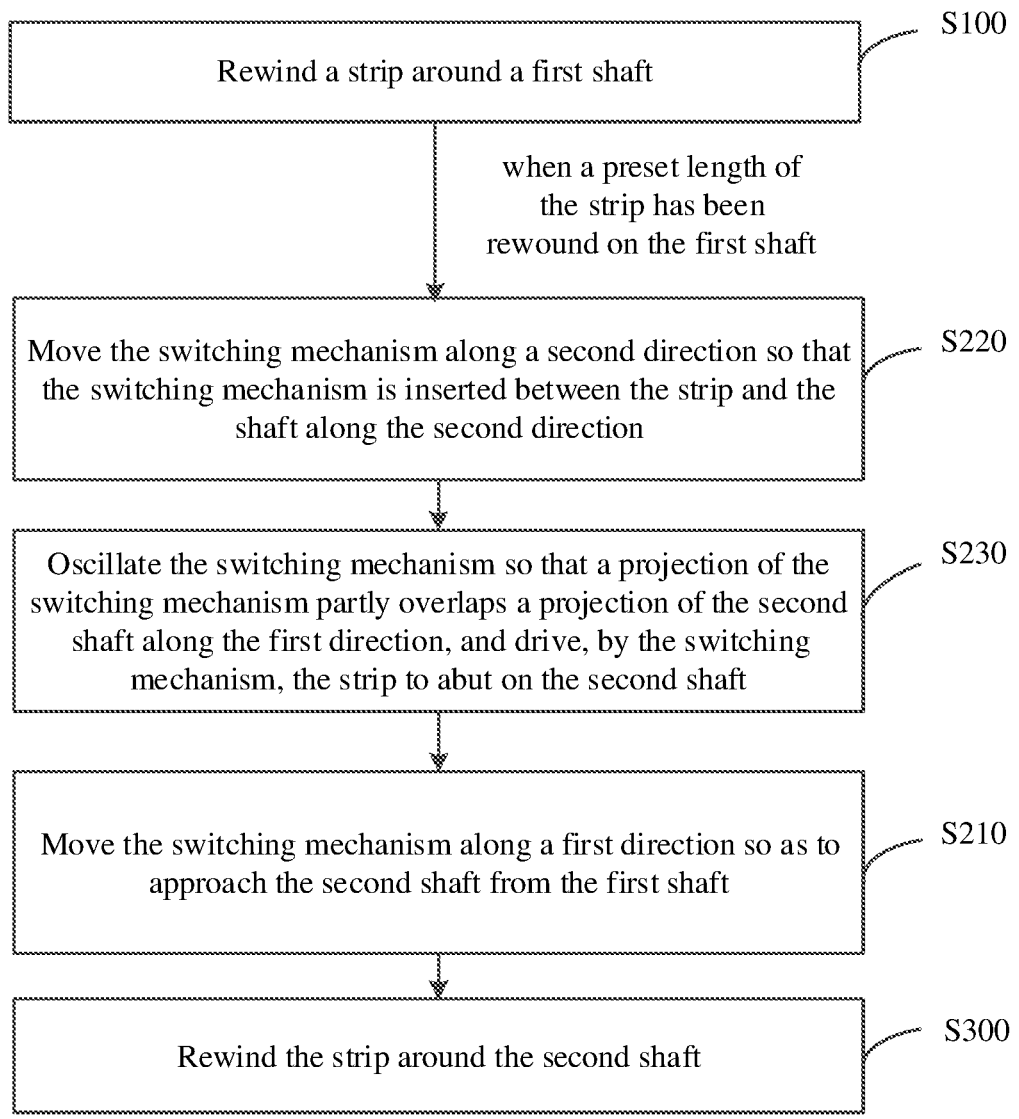
FIG. 9 is a detailed schematic flowchart of step S200 in a rewinding method according to some embodiments of this application.

Referring to FIG. 9, step 200 further includes the following step:

S210: Moving the switching mechanism along a first direction so as to approach the second shaft from the first shaft, where the first shaft and the second shaft are opposite to each other along the first direction and spaced out.

The moving roller may be driven by the first translational assembly to move along the first direction to further implement the switching. The operation method is simple and easy to implement.

Further, before step 210, the method includes the following step:

Step S220: Moving the switching mechanism along a second direction so that the switching mechanism is inserted between the strip and the shaft along the second direction, where the second direction is an extension direction of the first shaft.

The second translational assembly can drive the moving roller to move along the second direction. In this way, in a normal rewinding state, the second translational assembly can drive the moving roller to move along the second direction so that the moving roller is disposed opposite to the rewinding mechanism along the second direction to prevent the moving roller from hindering the rewinding mechanism from normally rewinding the strip. When the rewinding apparatus is in a switching state, the second translational assembly can drive the moving roller to get inserted between the strip and the shaft. Further, as driven by the first translational assembly, the shaft drives the strip to switch from one shaft to another shaft to implement rewinding.

Further, after step 220, the method includes the following step:

S230: Oscillating the switching mechanism so that a projection of the switching mechanism partly overlaps a projection of the second shaft along the first direction, and driving, by the switching mechanism, the strip to abut on the second shaft.

The rocker arm of the switching mechanism may be controlled to drive the moving roller to oscillate, thereby making it convenient for the switching mechanism to avoid other components in a process of driving the strip to switch between the shafts.

A person skilled in the art understands that when the switching operation is not required, the rocker arm, the first translational assembly, and the second translational assembly of the switching mechanism can still be controlled to drive the moving roller to move, so that the moving roller is prevented from hindering normal rewinding of the strip.

Figure 10:
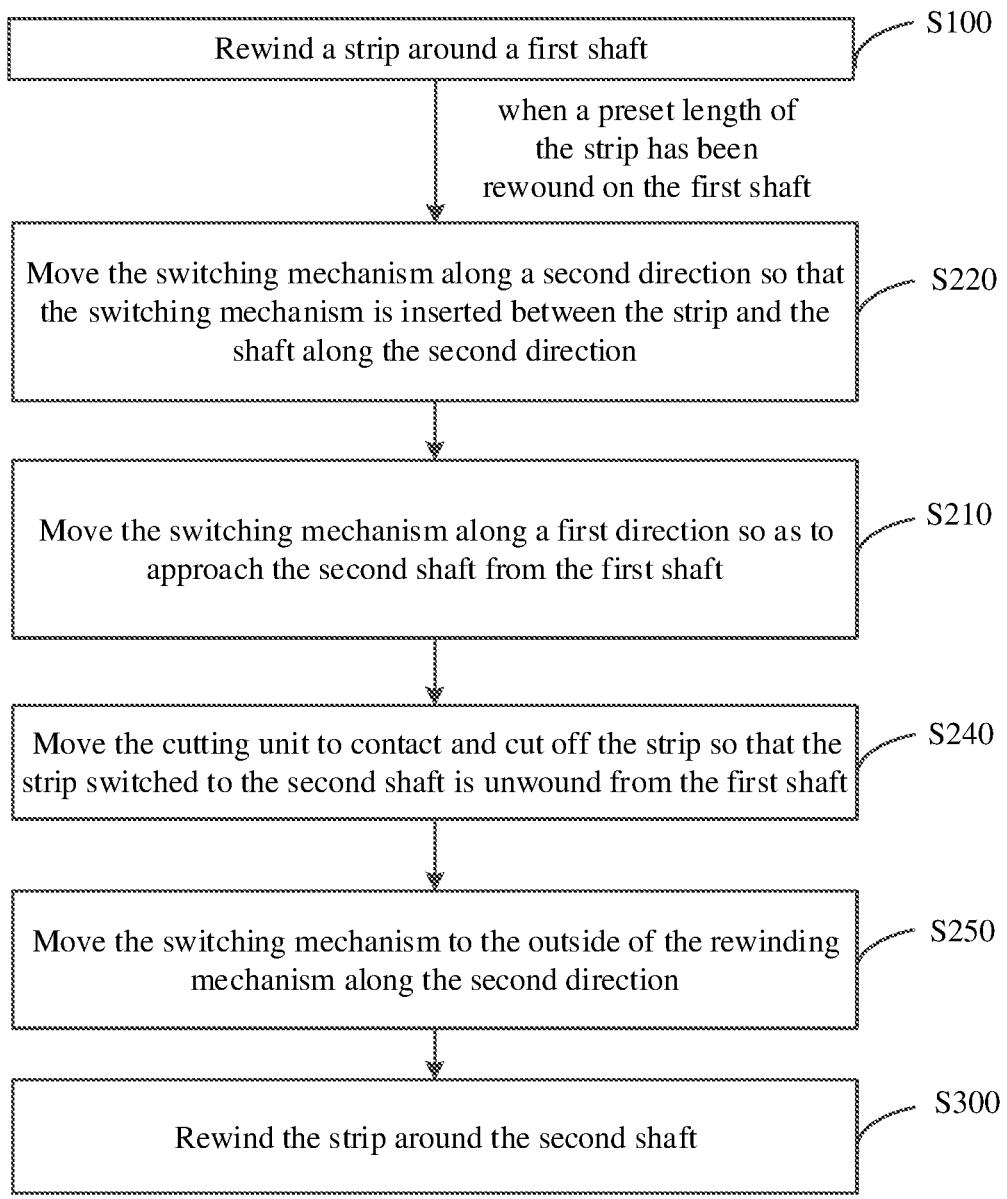
FIG. 10 is a detailed schematic flowchart of step S200 in a rewinding method according to some other embodiments of this application.

Referring to FIG. 10, in some other embodiments, after step S210, the method includes the following steps:

Step S240: Moving the cutting unit to contact and cut off the strip so that the strip switched to the second shaft is unwound from the first shaft; and Step S250: Moving the switching mechanism to the outside of the rewinding mechanism along the second direction.

The strip is cut off by the cutting unit so that the first shaft stops rewinding a new strip, and all the new strips are rewound onto the second shaft. The switching mechanism may control the second translational assembly to drive the moving roller to move. The moving roller moves to the outside of the rewinding mechanism, thereby preventing, to some extent, the switching mechanism from hindering the second shaft from rewinding.

Finally, it is hereby noted that the foregoing embodiments are merely intended to describe the technical solutions of this application but not to limit this application. Although this application has been described in detail with reference to the foregoing embodiments, a person of ordinary skill in the art understands that modifications may still be made to the technical solutions described in the foregoing embodiments, or equivalent replacements may still be made to some or all technical features in the technical solutions. Such modifications and equivalent replacements fall within the scope of the claims and specification hereof without making the essence of the corresponding technical solutions depart from the scope of the technical solutions of the embodiments of this application. Particularly, to the extent that no structural conflict exists, various technical features mentioned in different embodiments may be combined in any manner. This application is not limited to the specific embodiments disclosed herein, but includes all technical solutions falling within the scope of the claims.

What is claimed is:

1. A rewinding apparatus, configured to rewind a strip, wherein the rewinding apparatus comprises:
   a rewinding mechanism, comprising at least two shafts that are spaced out, wherein the two shafts are configured to rewind the strip along different conveyance paths separately; and
   a switching mechanism, comprising a moving roller, wherein the moving roller is configured to drive the strip to switch from one shaft to another shaft so that the strip switches from one conveyance path to another conveyance path, wherein the switching mechanism further comprises a cutting unit, the cutting unit is disposed between the shafts, and the cutting unit is configured to cut off the strip so that the strip switched to another shaft is unwound from one shaft, wherein the shaft comprises a hollow shaft body and a conduit made in the shaft body, the conduit is disposed along an axial direction of the moving roller, at least a part of the cutting unit is disposed in the shaft body, and a tool bit of the cutting unit is configured to protrude from the conduit to cut off the strip.

2. The rewinding apparatus according to claim 1, wherein that a number of the shafts is two, and the two shafts are opposite to each other along a first direction and spaced out; the switching mechanism comprises a first translational assembly, the first translational assembly extends along the first direction, and the first translational assembly is drivably connected to the moving roller so that the moving roller drives the strip to switch from one shaft to another shaft.

3. The rewinding apparatus according to claim 2, wherein the switching mechanism further comprises a second translational assembly, the second translational assembly extends along a second direction, the second direction is an extension direction of the shaft, the second translational assembly is drivably connected to the moving roller so as to drive the moving roller to get inserted between the strip and the shaft along the second direction.

4. The rewinding apparatus according to claim 3, wherein the second translational assembly is slidably connected to the first translational assembly.

5. The rewinding apparatus according to claim 3, wherein the first translational assembly comprises a first driving piece and a first slide rail extending along the first direction, the second translational assembly comprises a second driving piece and a second slide rail extending along the second direction, the first driving piece is configured to drive the second slide rail to move along the first slide rail, and the second driving piece is configured to drive the moving roller to move along the second slide rail.

6. The rewinding apparatus according to claim 3, wherein the switching mechanism further comprises a rocker arm, one end of the rocker arm is connected to the moving roller, another end of the rocker arm is connected to the second translational assembly, and the rocker arm is configured to drive the moving roller to oscillate.

7. The rewinding apparatus according to claim 1, wherein the rewinding mechanism further comprises a plurality of idler rollers, the idler rollers are disposed along the conveyance path, each shaft fits at least one idler roller to form a different conveyance path.

8. A rewinding method, configured to rewind a strip, comprising the rewinding apparatus of claim 1, wherein the rewinding method comprises:

rewinding the strip around a first shaft;

driving, by the switching mechanism when a preset length of the strip has been rewound on the first shaft, the strip to approach a second shaft from the first shaft so that the strip switches from the first shaft to the second shaft; and rewinding the strip around the second shaft.

9. The rewinding method according to claim 8, wherein the driving, by the switching mechanism, the strip to approach the second shaft from the first shaft comprises:

moving the switching mechanism along a first direction so as to approach the second shaft from the first shaft, wherein the first shaft and the second shaft are opposite to each other along the first direction and spaced out.

10. The rewinding method according to claim 9, wherein before the driving, by the switching mechanism, the strip to approach the second shaft from the first shaft, the method comprises:

moving the switching mechanism along a second direction so that the switching mechanism is inserted between the strip and the shaft along the second direction, wherein the second direction is an extension direction of the first shaft.

11. The rewinding method according to claim 10, wherein after the moving the switching mechanism along a second direction, the method comprises:

oscillating the switching mechanism so that a projection of the switching mechanism partly overlaps a projection of the second shaft along the first direction, and driving, by the switching mechanism, the strip to abut on the second shaft.

12. The rewinding method according to claim 10, wherein after moving the switching mechanism along a first direction so as to approach the second shaft from the first shaft, the method comprises:

moving the cutting unit to contact and cut off the strip so that the strip switched to the second shaft is unwound from the first shaft; and moving the switchingmechanism to an outside of the rewinding mechanism along the second direction.

* * * * *